United States Patent [19]

Martin et al.

[11] 4,195,062
[45] Mar. 25, 1980

[54] FLUE GAS SCRUBBING

[75] Inventors: James R. Martin, West Simsbury; Khaldoun W. Malki, Granby, both of Conn.

[73] Assignee: Combustion Engineering, Inc., Windsor, Conn.

[21] Appl. No.: 888,819

[22] Filed: Mar. 21, 1978

[51] Int. Cl.² ............................................. C01B 17/82
[52] U.S. Cl. .................................. 422/168; 422/189; 422/234
[58] Field of Search ............... 23/283, 284, 285, 260; 261/DIG. 9, 117; 55/228, 229, 22, 85, 86, 89, DIG. 30; 423/244; 422/169, 170, 234, 171, 172, 168, 189

[56] References Cited

U.S. PATENT DOCUMENTS

| 3,520,649 | 7/1970 | Tomany | 423/244 |
|---|---|---|---|
| 3,841,060 | 10/1974 | Hoad | 261/117 |
| 3,948,608 | 4/1976 | Weir | 23/284 |
| 3,989,465 | 11/1976 | Onnen | 23/284 |
| 4,047,891 | 9/1977 | Schuetz | 55/228 |
| 4,081,513 | 3/1978 | Moss | 423/244 |

OTHER PUBLICATIONS

Lime/Limestone Air Quality Control Systems: Effect of Magnesium on System Performance, D. Frabotta et al., presented at the Winter Annular Meeting of the American Society of Mechanical Engineers, N.Y., N.Y., Dec. 5-10, 1976.

Primary Examiner—Joseph Scovronek
Assistant Examiner—Chris Konkol
Attorney, Agent, or Firm—Edward L. Kochey, Jr.

[57] ABSTRACT

A limestone flue gas scrubbing system includes a confining means which collects the effluent from the spray tower. A portion of this effluent is removed to a secondary reaction tank which operates at low pH for increased utilization of the additive. A first portion of the flow from the tank is passed to waste with the liquid portion returning to the main additive tank. A remaining portion of the slurry from the secondary tank is recirculated to the spray tower in parallel with the main slurry flow from the main reaction tank.

1 Claim, 1 Drawing Figure

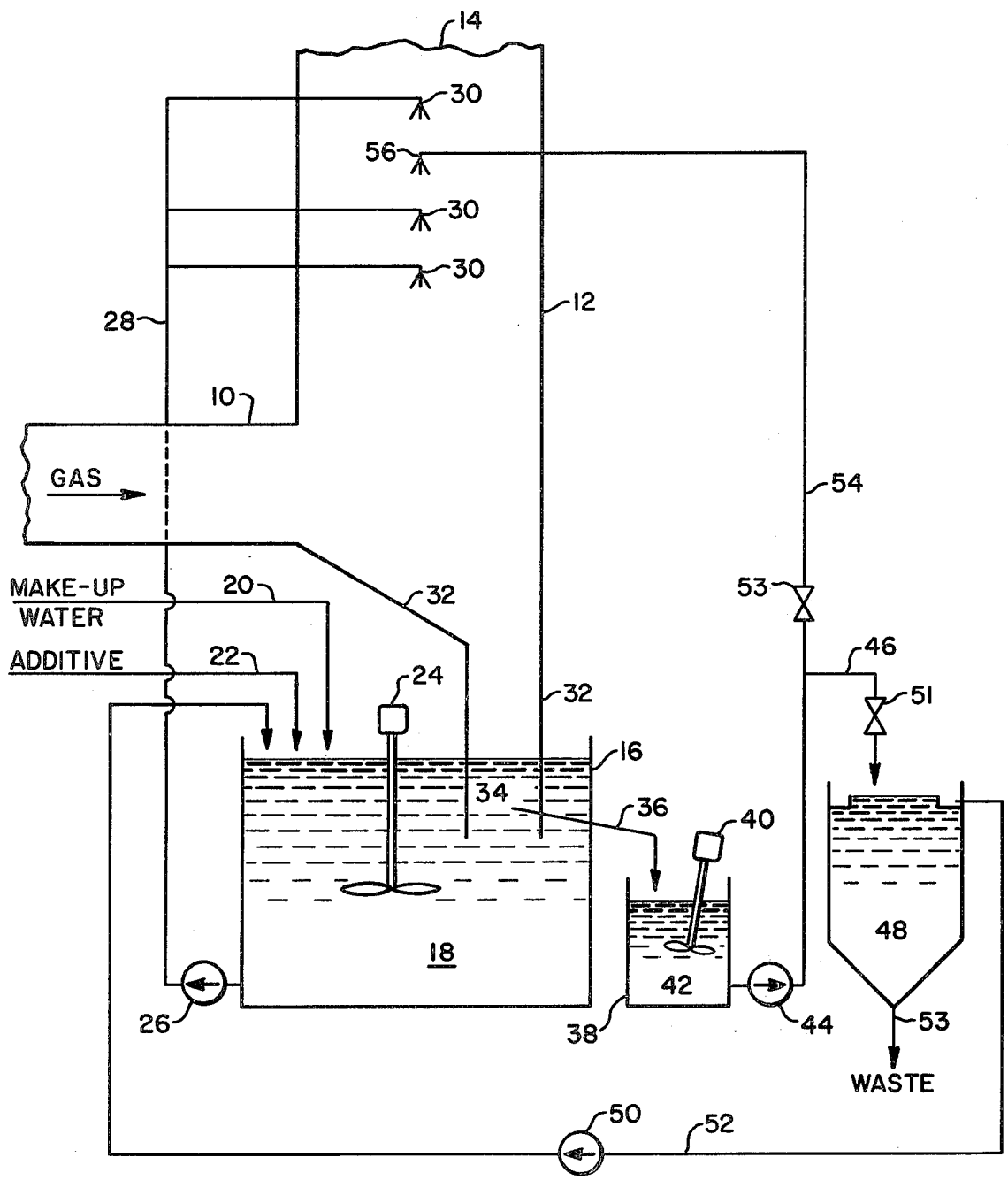

FLUE GAS SCRUBBING

BACKGROUND OF THE INVENTION

This invention relates to a flue gas scrubbing system for removal of sulfur dioxide from flue gases of a steam generator, and in particular to an arrangement which more effectively utilizes the limestone of such a system. Flue gas scrubbing systems of the type contemplated herein and the chemistry involved are described in a paper entitled "Lime/Limestone Air Quality Control Systems: Effect of Magnesium On System Performance", by Messrs. Frabotta and Rader and presented at the Winter Annual Meeting of the ASME during Dec. 5-10 of 1976. The prior art systems in general suffer in that a portion of the freshly added limestone is conveyed to waste along with disposal of the unwanted waste products.

SUMMARY OF THE INVENTION

It is an object of the present invention to increase the utilization of the limestone and to reduce the loss of the limestone to waste. A secondary reaction tank is used in addition to a main reaction tank. The secondary tank receives slurry only from a confining zone which contains returning slurry from the spray tower. A portion of the slurry in the secondary tank is thickened, with the solids being sent to waste and the liquid being returned to the main reaction tank. The remainder of the slurry in the secondary tank is returned to an upper elevation and sprayed into the gas to be scrubbed.

BRIEF DESCRIPTION OF THE DRAWING

The FIGURE is a schematic illustration of the flue gas scrubbing system.

BRIEF DESCRIPTION OF THE PREFERRED EMBODIMENT

Flue gas containing $SO_2$ passes inwardly through duct 10 and flows upwardly through scrubber duct 12 passing outwardly through exit 14. A main reaction tank 16 contains slurry 18. In accordance with conventional operating modes, make-up water is added through line 20 and limestone through line 22.

Mixer 24 stirs the tank to keep the slurry in suspension and to accelerate the chemical reactions. Pump 26 operates to pump the slurry through line 28 to an upper elevation where the slurry is sprayed through nozzles 30 from which it passes downwardly in intimate and direct contact with the flue gas. $SO_2$ is thereby removed from the gas.

At a lower elevation confining means 32 collects the returning slurry in volume 34. From this point, the slurry continues downwardly into the remainder of the main reaction tank 16.

A portion of the returning slurry passes by gravity feed through line 36 as the only supply to the secondary reaction tank 38. Mixer 40 operates to maintain the tank in a stirred condition. Because of the limestone added to tank 16, slurry 18 is maintained at a relatively high pH ranging between 5.5 and 6.5. At this pH, the following additive dissolution reactions take place:

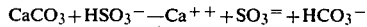

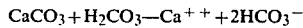

These reactions are relatively slow because of this pH. Since limestone is added to the reaction tank in the prior art, the pH is maintained between 5.5 and 6. The volume of fluid 42 in the secondary reaction tank 38 will be at a relatively low pH in the order of 4 to 5 since its only supply is the returning slurry from the scrubbing tower which contains the least amount of alkalinity throughout the whole system. Because of this lower pH, the above reactions take place at a faster rate compared with tank 16 and compared with the reaction tank in the prior art.

Pump 44 removes the slurry from this tank with a portion of this slurry passing through line 46 to thickener 48. The solids are removed in this tank and sent to waste 53 with the remaining liquid being pumped by pump 50 through line 52 back to the main reaction tank 16. Manipulation of valves 51 and 53 regulate the allocation of slurry between line 54 and thickener 48.

The utilization of limestone is increased by this loop since the returning liquid now contains greater amounts of dissolved limestone compared with the prior art system.

The remaining portion of slurry pumped by pump 44 from tank 38 is passed to an upper elevation through line 54 and sprayed through nozzle 56. This operates in parallel with the normal spray through line 28 and nozzle 30. The slurry then is cascaded downwardly through the flue gas in intimate contact therewith and collected in the confining means 32. This further results in improved utilization of the limestone because of the enhanced limestone dissolution stemming from relatively low pH in tank 38 discussed earlier.

Further, the disclosure loop represents a two stage reaction system, with tanks 16 and 12 representing the first stage and tank 38 representing the second stage. The prior art represents a single stage reactor. Since a two stage is more efficient than a single stage reactor, the disclosure loop allows better additive dissolution than the prior art.

The net result is that the limestone utilization is increased by this loop since the waste line 53 now contains less $CaCO_3$ than in the prior art systems.

What is claimed is:

1. A limestone additive flue gas scrubbing system for $SO_2$ removal comprising: a main reaction tank containing slurry; means for adding make-up water to said main reaction tank; means for adding limestone to said main reaction tank; duct means for confining the flue gas stream; means for pumping the slurry to an upper elevation and passing the slurry through the flue gas in direct contact therewith; confining means at a lower elevation for collecting the returning slurry and guiding the slurry back to said main reaction tank; a secondary reaction tank; means for conveying a portion of the returning slurry directly from said confining means to said secondary reaction tank as the only supply thereto; a thickener; means for conveying a first portion of the slurry from said secondary reaction tank to said thickener; means for returning the liquid portion of said slurry from said thickener to said main reaction tank; means for conveying the remaining portion of the slurry from said second tank to an upper elevation and passing the slurry through the flue gas in direct contact therewith.

* * * * *